E. E. NOVOTNY.
PRINTING PLATE.
APPLICATION FILED NOV. 2, 1920.

1,377,519.   Patented May 10, 1921.

Inventor
Emil E. Novotny,
By his Attorneys
Meyers, Cavanagh & Hyde

UNITED STATES PATENT OFFICE.

EMIL E. NOVOTNY, OF LOGAN, PENNSYLVANIA, ASSIGNOR TO JOHN STOGDELL STOKES, OF PHILADELPHIA, PENNSYLVANIA.

PRINTING-PLATE.

1,377,519.   Specification of Letters Patent.   Patented May 10, 1921.

Application filed November 2, 1920. Serial No. 421,316.

*To all whom it may concern:*

Be it known that I, EMIL E. NOVOTNY, a citizen of the United States, and resident of Logan, in the county of Philadelphia and State of Pennsylvania, have invented certain new and useful Improvements in Printing-Plates, of which the following is a specification.

My present invention pertains to printing plates, and has particular relation to a molded printing plate formed from a composition which includes a synthetic resin, in the nature of a phenolic condensation product, containing furfural or a derivative of the latter as an ingredient. Hitherto it has been proposed to make molded printing plates of a composition containing synthetic resin, the latter being formed by the combination and reaction of phenol and formaldehyde. I have found that by using furfural as an ingredient of the phenolic condensation product, I am enabled to make printing plates which will possess great hardness and infusibility, and consequently long wearing qualities, and will present brilliant, smooth, glossy, highly polished surfaces of a deep jet-black appearance, and this by the natural reaction of the furfural product with the other ingredients, and without the addition of pigments or coloring matter. Furthermore, by the use of furfural, or a derivative thereof, for instance, furfuramid, as an ingredient of the resinous substance, I am enabled to obtain ready and clean separation of the molded matrix from its plate, thus obviating the liability of marring or destroying the plate which might be caused by the sticking of the latter to the mold or matrix. With the use of a synthetic resin containing furfural or a derivative thereof, the plate will assume such a hard, set and infusible condition that it may be removed from the matrix while still hot.

In the accompanying drawings, Figure 1 is a cross sectional view, taken through a double coated blank which I prefer to use in making my printing plate.

Where I herein use the term "phenol", I wish this to be understood as including cresol, resorcinol, naphthol, and similar substances possessing characteristics enabling them to be used for my purposes, in the same manner as the phenol is used; and where I use the term "furfural", I wish this to be understood as including furfural, or a suitable derivative thereof, such as furfuramid.

Figure 1:
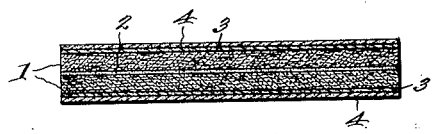

In manufacturing my printing plate, I first provide a blank, such, for instance, as shown in Fig. 1, and which briefly stated comprises a plurality of sheets 1, preferably of long fiber material such as cardboard, strawboard, paper or cloth, these sheets being impregnated with a synthetic resin, and cemented together as shown at 2 and as hereafter set forth. The laminated fiber sheet is preferably provided on each side with an intermediate or barrier coat 3, and each barrier coat is in turn faced with an exterior or surface coat 4. The coats 3 and 4 are formed of synthetic resinous material containing furfural, but the surface coats 4 are of a richer material and more tenuous, but less hard and brittle than the barrier coats 3.

In connection with the operation of impregnating the fiber sheets 1, I first make a fusible synthetic resin or gum by mixing or combining, for example, 100 parts of phenol to 15 to 40 parts of furfural, treated with from 5 to 10 parts of a catalyst such as hydrochloric acid of about 39% strength, these proportions being by weight. I dissolve this fusible gum in a suitable solvent such as acetone or alcohol, preferably using three parts by weight of the solvent to one part of the fusible gum or resin. At the time of dissolving the fusible resin or gum in the solvent I may also add a suitable hardening agent, such as hexa-methylene-tetramin, using by weight, 5 to 20 parts of this hardening agent in proportion to the weight of the fusible gum being acted upon. I may also use as a hardening agent furfural derivative, furfuramid, in any suitable proportion, say from 8 to 40% by weight of the mass or mixture being treated. I may also use furfural which is for the hardening agent, but when so doing, I add a suitable catalyst, such as ammonia. The use of such catalyst is not necessary where the derivative, furfuramid, is employed, as the latter itself contains ammonia. After this solution or bath has been prepared, the fiber sheets are subjected to the same, as by soaking, or otherwise saturating, and after removal from the bath are preferably passed through a wringer or other machine to express a surplus liquid therefrom. The sheets are then subjected to the action of heat, as in an oven, to drive off the volatile solvent and any moisture that may be present, so that when dry the sheets of fiber will contain in the cellular structure, a minimum amount of the synthetic resinous material in a partially harder or reacted form, so that while allowing the sheet to be compressed and molded at this stage, the resin will not flow or ooze when subjected to molding action. But a minimum amount of the synthetic resin will be found to be incorporated in the sheets, the major portion of the bulk of the sheets being made up of the fibrous substance. These impregnated, partially reacted sheets are then cemented together by the cement layers 2, this cement being of any suitable character, such as synthetic resinous cement, composed of the same materials as constitute the impregnate resin just described. Of course any suitable cement may be used for uniting the sheets. After the sheets have been cemented together they are preferably subjected to pressure through any suitable agency to cause an intimate union of the same and thus form a laminated impregnated body of porous compressible structure.

I then apply to this laminated, impregnated body, the barrier coats 3. These coats are applied in the form of a thick paint-like varnish, which is made, for example, by taking one part of the phenol furfural resin heretofore described, and mixing therewith four parts of barium sulfate and two parts of alcohol, the mixture being thoroughly commingled and ground, preferably in a ball mill. The barium sulfate is added for the purpose of giving hardness to the barrier coats when the latter are in their infusible state, but such barium sulfate will also add to the brittleness of these barrier coatings. But this brittleness is immaterial; for the purpose of these barrier coats is to prevent the penetration of the material of the surface coatings 4 into the fibrous body. As hereafter stated, the surface coatings 4 are of a richer material, and are more tenuous and less brittle, but softer than the barrier coats. With the barrier coats applied, the laminated body is now subjected to the further action of heat, as in an oven, to drive off the volatile solvent, and to cause a partial reaction or hardening and setting of the material of the barrier coats. This additional heat will also cause a further reaction or hardening of the synthetic resin impregnating the fiber, but neither the barrier coats, nor the resin incorporated in the fiber will be hardened beyond the point of capability of molding, although they will be hardened past the point of pronounced flow.

The laminated body with the dry barrier coats is now ready for the reception of the surface coatings 4. These surface coatings are also composed of synthetic resinous material, the latter being made up of the furfural-phenol resin or gum as heretofore described, preferably mixed with a filler such as lampblack and suitable quantity of alcohol or other solvent, the mixture being ground in a ball mill so that when ready for use it will have the consistency of a relatively heavy varnish. It will be noted that the barium sulfate is omitted from the synthetic resinous coatings 4, but if desired, the filler, such as the lampblack may also be omitted and the material of the coating made up by simply mixing the synthetic resin or gum composition with alcohol. When the coatings 4 of this richer quantity of synthetic resin have been applied, the blank is again subjected to the action of heat, as in an oven, to eliminate moisture, and to cause these surface coatings 4 to partially react and to assume a skin-like, tenuous, but non-flowing condition. When sufficiently dried, or "pre-cooked," the now complete sheet is removed from the oven and while all the synthetic resin contained therein is reacted so as to be devoid of flow, yet the blank is capable of being molded to the desired form, and each skin-like face 4 will readily and sensitively take an impression from a printing plate matrix, accurately reproducing all of the finest details of the matrix.

Figure 3:
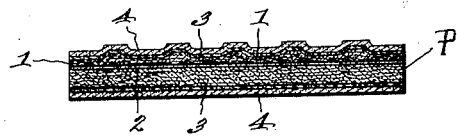
Fig. 3 is a cross sectional view taken through a molded printing plate made from the double faced blank shown in Fig. 1.

When it is desired to make the printing plate, the blank is imposed upon the matrix, preferably a metal-faced matrix, and heat and pressure applied, for a sufficient length of time, say 1 to 5 minutes, to cause the blank to be compressed and the material thereof forced into all the depressions and irregularities of the matrix molding face, and at the same time to cause a further reaction of the synthetic resinous material and the hardening and setting of the same to a point of relative infusibility. After the plate has been molded it is removed from the matrix, and if desired, may be subjected to further heating, in an oven, or to pressure between the heated platens of a press, to increase its hardness and infusibility. The finished plate, which is indicated as an entirety by the letter "P" in Fig. 3, will be found to be accurate as to all molding dimensions, and to present smooth, brilliant, jet-black, glossy printing faces which will readily take the ink, which may be easily cleaned, and which will produce the highest grade printing. I might state that in making the plate, the barrier coating is preferably applied to a thickness of about .004 of an inch, while the surface coatings 5 are of a thickness of about .010 of an inch.

Thereafter it will be seen that I use but a relatively small amount of synthetic resin in my plate, and consequently am able to produce the same economically.

Figure 2:
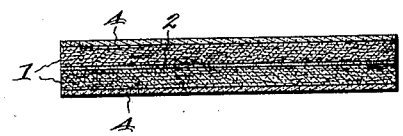
Fig. 2 is a similar view taken through a single coated blank which may be used in making my printing plate.

In Fig. 2 I have shown a finished blank for making the printing plate, and wherein I use but a single coat, indicated at 4, instead of the double coating as shown for the blank in Fig. 1. This coating 4 is formed in substantially the same manner as the coating 3, and when using this blank of Fig. 2, the surface coating or printing face of the plate may be made by sprinkling the synthetic resin material, in the form of a powder upon the face of the matrix, and then placing the blank of Fig. 2 thereagainst and applying heat and pressure as usual. The result will be that the powdered material on the matrix will be fused or welded into a homogeneous, skin-like sheet, and will be firmly united with the coat 4 of the blank of Fig. 2, and consequently to the fibrous body. It will, of course, be understood that any suitable number of fibrous laminations may be employed, and indeed the body may be made up of a single fibrous sheet, although I prefer to use laminated structure. Furthermore, for some purposes it will be unnecessary to impregnate the fiber sheet or sheets, but to obtain the advantages of strength, rigidity, and durability, I prefer to impregnate the fiber as above described. It will be understood that the relative percentages of the ingredients of the mixtures hereinbefore given, may be varied to suit conditions of hardness and fusibility desired.

Furthermore, instead of combining furfural with phenol in the formation of the synthetic resin, I may first make a fusible resin of phenol and formaldehyde in the proportions by weight of say 100 parts of phenol to 55 parts of formaldehyde, and then treat this fusible mass with furfural or furfuramid as the hardening agent to render the resin or gum infusible when subjected to a sufficient degree of heat.

I may also first make a fusible resin by the action of acetaldehyde or paraldehyde with phenol in the proportions by weight of say 100 parts of phenol to 37 parts of the acetaldehyde or paraldehyde, treating the mass with a catalyst such as hydrochloric acid in the proportion of ½ of 1% by weight of the catalyst to the weight of the mass, and the fusible gum thus formed may be treated with furfural or its derivative, furfuramid, as the hardening agent, in the proportions by weight of from 15 to 40 parts of furfural or furfuramid to the weight of the mass of the fusible resin being treated, to render the rest infusible under the application of the proper degree of heat.

It will be noted, however, that in each instance, in the preparation of the synthetic resin, I resort to the use of furfural, or a derivative thereof, as an ingredient, as I have found that by so doing, I obtain a superior product for molding purposes.

What I claim is—

1. A printing plate comprising a supporting body treated with a synthetic resin containing furfural and provided with a printing face.

2. A printing plate comprising a body of porous material and a printing face therefor composed of a synthetic resin containing furfural.

3. A printing plate comprising a fibrous body having a printing face containing furfural.

4. A printing plate comprising a body of porous material impregnated with a synthetic resin containing furfural and a printing face on the body.

5. A printing plate comprising a body of porous material impregnated with a hard and set synthetic resin containing furfural and having a printing face composed of synthetic resin also containing furfural.

6. A printing plate comprising a porous body having a printing face composed of a synthetic resin containing phenol, furfural, and a hardening agent.

7. A printing plate comprising a porous body treated with a hard and set synthetic resin, containing phenol, furfural and a methylene hardening agent.

8. A printing plate comprising a body of porous material treated with a synthetic resin, containing phenol, furfural and hexamethylene-tetramin as a hardening agent.

9. A printing plate comprising a body portion, a furfural-containing barrier coat applied thereto, and a furfural-containing printing face imposed on the barrier coat.

10. A printing plate comprising a body portion having a barrier coating and a printing face imposed on the barrier coating, one of said coatings containing furfural.

11. A printing plate comprising a plurality of fibrous sheets united to form a laminated body, said sheets being impregnated with hard and set synthetic resin containing furfural, and a printing face imposed on the body and formed of a synthetic resin containing furfural.

Signed at Philadelphia, in the county of Philadelphia and State of Pennsylvania, this 29th day of October, A. D. 1920.

EMIL E. NOVOTNY.